US012062263B2

(12) United States Patent
Bouvier et al.

(10) Patent No.: US 12,062,263 B2
(45) Date of Patent: Aug. 13, 2024

(54) GAMING MACHINE AND METHOD WITH RATCHETING ENHANCEMENT FEATURE

(71) Applicant: LNW Gaming, Inc., Las Vegas, NV (US)

(72) Inventors: George Bouvier, Henderson, NV (US); Kenneth Shawn Soong, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/678,412

(22) Filed: Feb. 23, 2022

(65) Prior Publication Data

US 2023/0267808 A1 Aug. 24, 2023

(51) Int. Cl.
*G07F 17/32* (2006.01)
*G07F 17/34* (2006.01)

(52) U.S. Cl.
CPC ...... *G07F 17/3267* (2013.01); *G07F 17/3244* (2013.01); *G07F 17/34* (2013.01); *G07F 17/3213* (2013.01)

(58) Field of Classification Search
CPC ............. G07F 17/3213; G07F 17/2344; G07F 17/3267; G07F 17/34
See application file for complete search history.

(56) References Cited

U.S. PATENT DOCUMENTS 6,004,207 A 12/1999 Wilson et al.
6,482,089 B2 11/2002 Demar et al.
6,561,904 B2 5/2003 Locke et al.
6,575,830 B2 6/2003 Baerlocher et al.
6,638,164 B2 10/2003 Randall et al.
6,685,561 B2 2/2004 Anderson et al.
7,147,559 B2 12/2006 Englman
7,247,092 B2 7/2007 Jarvis et al.
(Continued)

FOREIGN PATENT DOCUMENTS

WO 03083795 A1 10/2003

*Primary Examiner* — Dmitry Suhol
*Assistant Examiner* — Jason Pinheiro

(57) ABSTRACT

There is provided a gaming system, gaming machine, and method that presents a set of persistent enhancers as well as a plurality of symbols in an array corresponding to a plurality of symbol-bearing reels. The plurality of symbol-bearing reels bear game symbols. Each of the persistent enhancers is paired respectively with a separate one of a subset of the game symbols. The persistent enhancers persist across a plurality of game cycles of the game. Game-logic circuitry uses a random number generator to spin and stop the reels for a first game cycle, to populate the array with a portion of the game symbols. The game-logic circuitry detects, in response to the spinning and stopping, occurrence of one or more win events associated with one or more of the subset of the game symbols. In response to detecting a win event, the game-logic circuitry enhances an award for the win event using one of the persistent enhancers that is paired with a subset symbol displayed for the win event. Furthermore, the game-logic circuitry resets the used persistent enhancer to a default value and also increments one or more values of un-used ones of the persistent enhancers. The reset value(s) and incremented value(s) persist to a second game cycle subsequent to the first game cycle.

10 Claims, 10 Drawing Sheets

(56) References Cited

U.S. PATENT DOCUMENTS 7,258,611 B2 8/2007 Bigelow, Jr. et al.
7,306,518 B2 12/2007 Hughs-Baird et al.
7,338,370 B2 3/2008 Oles et al.
7,354,342 B2 4/2008 Paulsen et al.
7,377,850 B2 5/2008 Shackelford et al.
7,442,123 B2 10/2008 Brill et al.
7,455,588 B2 11/2008 Webb et al.
7,553,231 B2 6/2009 Rodgers et al.
7,588,494 B2 9/2009 Hughs-Baird et al.
7,607,980 B2 10/2009 Masci et al.
7,666,083 B2 2/2010 Baerlocher et al.
7,666,086 B2 2/2010 Baerlocher
7,749,070 B2 7/2010 Baerlocher et al.
7,785,188 B2 8/2010 Cannon
7,789,744 B2 9/2010 Fiden
7,819,740 B2 10/2010 Masci et al.
8,002,625 B2 8/2011 Maya
8,062,124 B2 11/2011 Jaffe
8,096,878 B2 1/2012 Durham et al.
8,109,823 B2 2/2012 Aoki
8,177,620 B2 5/2012 Miles et al.
8,177,622 B2 5/2012 Englman
8,192,272 B2 6/2012 Thomas et al.
8,197,331 B2 6/2012 Pacey et al.
8,272,938 B2 9/2012 Gilmore et al.
8,272,944 B2 9/2012 Englman et al.
8,277,305 B2 10/2012 Caputo et al.
8,303,402 B2 11/2012 Aoki et al.
8,439,737 B1 5/2013 Moody
8,480,481 B2 7/2013 Vann
8,550,897 B2 10/2013 Hornik et al.
8,622,805 B2 1/2014 Gomez et al.
8,678,908 B2 3/2014 Nicely
8,690,659 B2 4/2014 Moody
8,764,537 B2 7/2014 Jaffe et al.
8,771,051 B2 7/2014 Mattice et al.
8,894,481 B2 11/2014 Saunders et al.
8,905,836 B2 12/2014 Saunders et al.
8,979,634 B2 3/2015 Pacey et al.
8,979,639 B2 3/2015 Saunders et al.
9,011,227 B2 4/2015 Moody
9,138,634 B2 9/2015 Moody
9,240,104 B2 1/2016 Lange et al.
9,483,915 B2 11/2016 Gilbertson et al.
9,501,892 B2 11/2016 Englman et al.
9,576,440 B2 2/2017 Keilwert
9,613,499 B2 4/2017 Pacey
9,704,342 B2 7/2017 Aoki et al.
9,916,731 B2 3/2018 Allen et al.
9,940,794 B2 4/2018 Comeau
10,019,872 B2 7/2018 Sherrets et al.
10,297,103 B2 5/2019 Hornik et al.
10,410,472 B2 9/2019 Moody
10,755,518 B2 8/2020 Wright
10,867,483 B1 * 12/2020 Penacho ............. G07F 17/3244
10,930,117 B2 2/2021 Moody
10,957,147 B1 3/2021 Knight et al.
2004/0204228 A1 * 10/2004 Walker .................... G07F 17/34 463/20
2009/0124326 A1 * 5/2009 Caputo ................... G07F 17/34 463/20
2013/0065662 A1 * 3/2013 Watkins .............. G07F 17/3267 463/20
2017/0309125 A1 * 10/2017 Moody ............... G07F 17/3293
2017/0316655 A1 * 11/2017 Holsclaw ............ G07F 17/3251
2018/0122189 A1 * 5/2018 Wortmann .......... G07F 17/3213
2020/0090467 A1 * 3/2020 Marks ................. G07F 17/3225
2021/0056810 A1 * 2/2021 La Guardia ......... G07F 17/3265
2021/0142622 A1 * 5/2021 Sanborn .................. G07F 17/34

* cited by examiner

GAMING MACHINE AND METHOD WITH RATCHETING ENHANCEMENT FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, LNW Gaming, Inc.

FIELD OF THE INVENTION

The present invention relates to a technological improvement to gaming systems, gaming machines, and methods and, more particularly, to new and improved animations in connection with a symbol presentation feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that presents a set of persistent enhancers as well as a plurality of symbols in an array corresponding to a plurality of symbol-bearing reels. The plurality of symbol-bearing reels bear game symbols. Each of the persistent enhancers is paired respectively, with a separate one of a subset of the game symbols. The persistent enhancers persist across a plurality of game cycles of the game. Game-logic circuitry uses a random number generator to spin and stop the reels for a first game cycle, to populate the array with a portion of the game symbols. The game-logic circuitry detects, in response to the spinning and stopping, occurrence of one or more win events associated with one or more of the subset of the game symbols. In response to detecting a win event, the game-logic circuitry enhances an award for the win event using one of the persistent enhancers that is paired with a subset symbol displayed for the win event. Furthermore, the game-logic circuitry resets the used persistent enhancer to a default value and also increments one or more values of un-used ones of the persistent enhancers. The reset value(s) and incremented value(s) persist to a second game cycle subsequent to the first game cycle.

Additional aspects of the invention will be apparent to those of ordinary skill in the art in view of the detailed description of various embodiments, which is made with reference to the drawings, a brief description of which is provided below.

Figure 1:
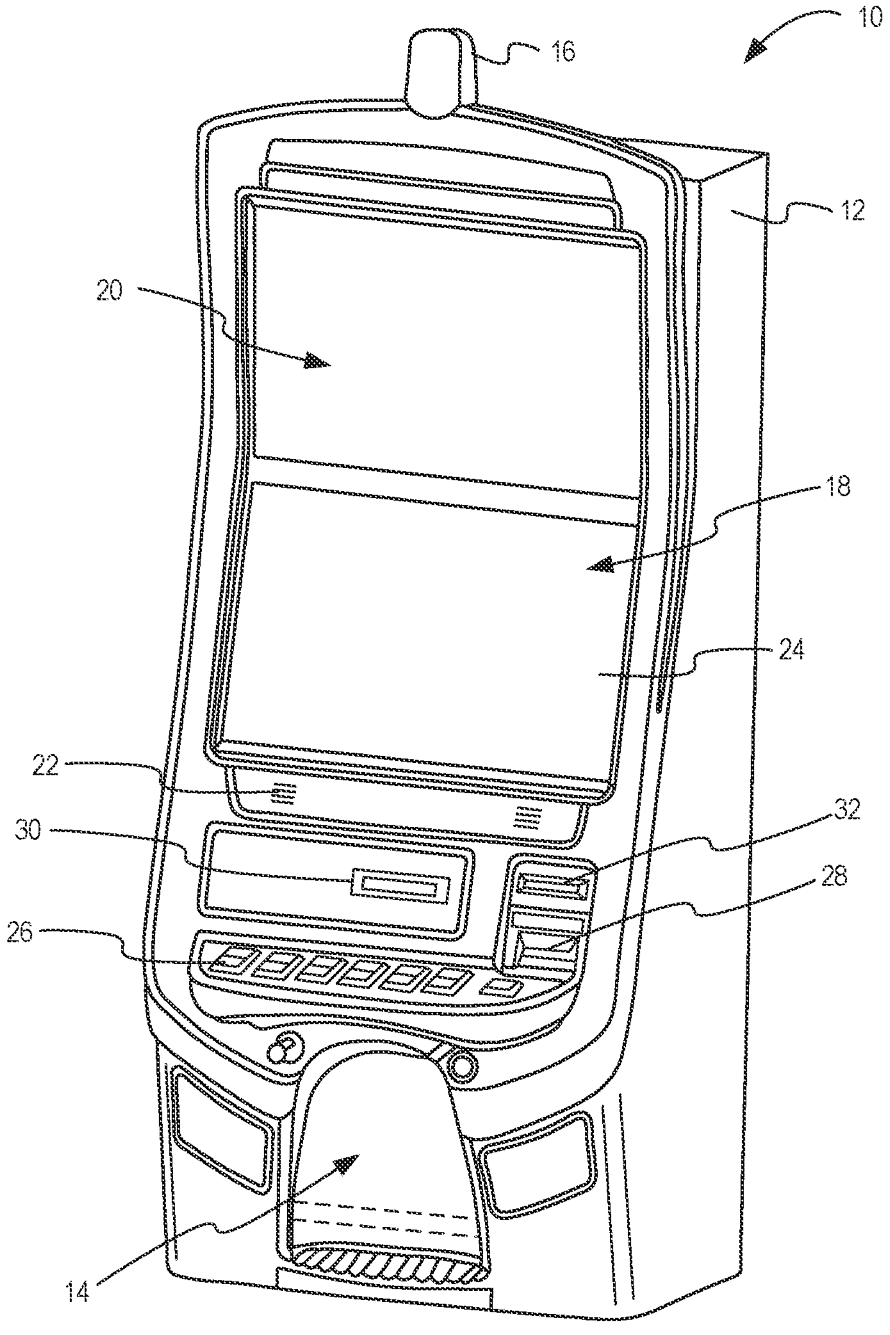
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely, resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OILED or e-paper displays are affixed to electro-mechanical reels. The aforementioned U.S. Pat. Nos. 6,517,433, 7,654,899, 7,452,276, and 8,591,330 are each incorporated herein by reference in their respective entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry 40 for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter (e.g., credit meter 200 shown in FIGS. 4, 5, 6, 7, 8, 9). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the credit meter (e.g., credit meter 200), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
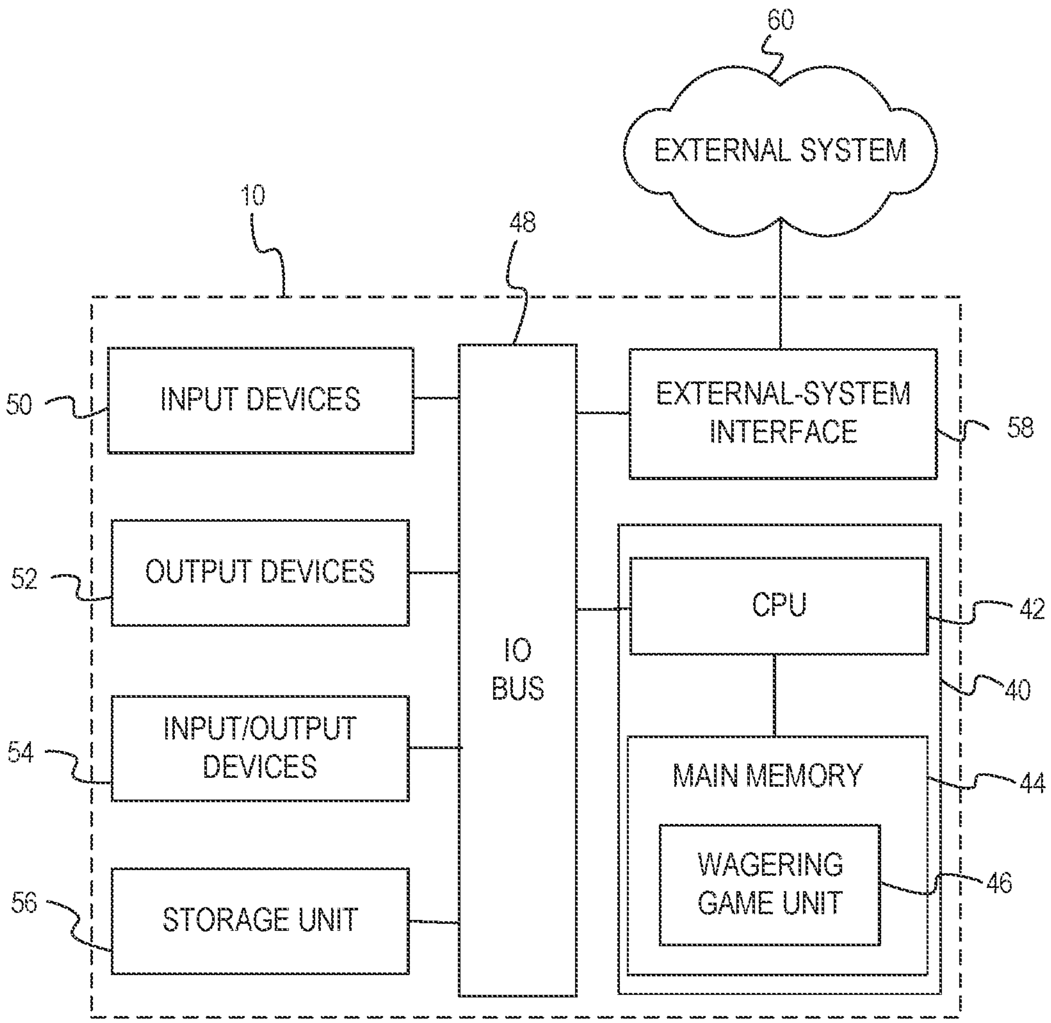
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL÷ frontside bus and a PCI backside bus. The I/O bus 48 is connected to various input devices 50, output devices 52, and input/output devices 54 such as those discussed above in connection with FIG. 1. The bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40 whether located within ("thick client"), external to ("thin client"), or distributed both within and external to ("intermediate client") the gaming machine 10 is utilized to provide a wagering game on the gaming machine 10. In general, the main memory 44 stores programming for a random number generator (RNG), game-outcome logic, and game assets (e.g., art, sound, etc. all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry 40 facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RING, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example) As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially, in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
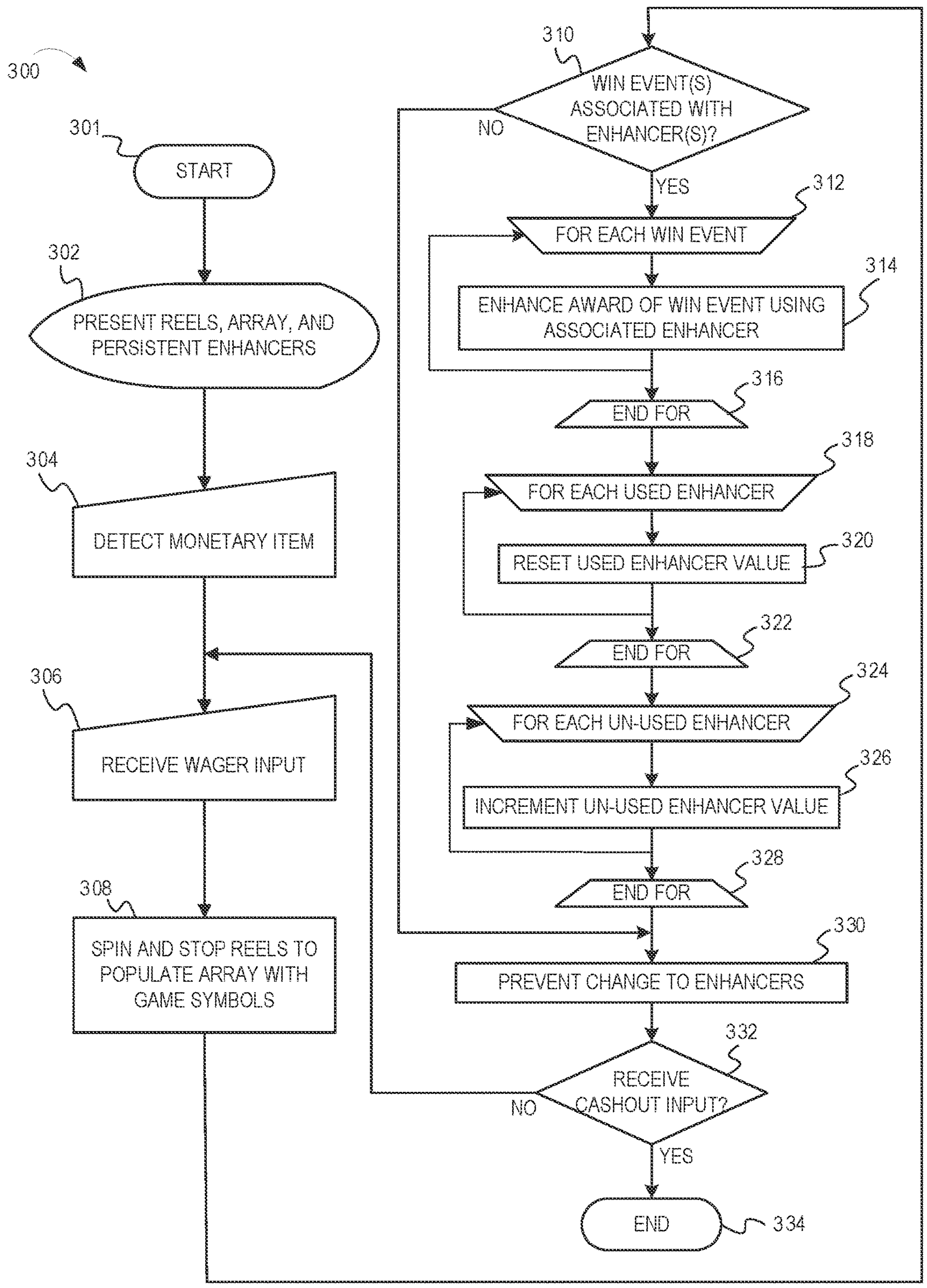
FIG. 3 is a flowchart for an algorithm that corresponds to instructions executed by a controller, according to an embodiment of the present invention.
Figure 4:
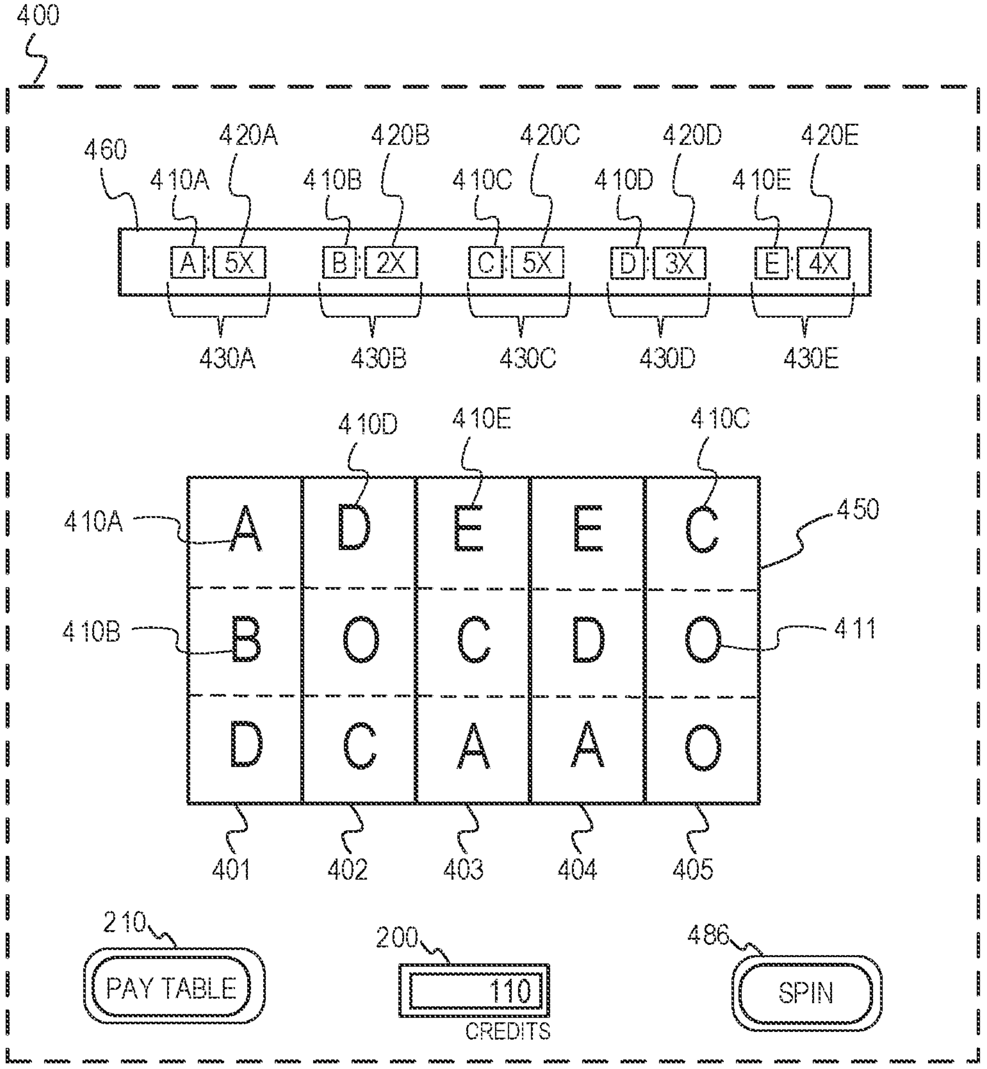
FIGS. 4, 5, 6, 7, 8, and 9, are diagrams of game features illustrating aspects of the flowchart in FIG. 3, according to one or more embodiments of the present invention.
Figure 5:
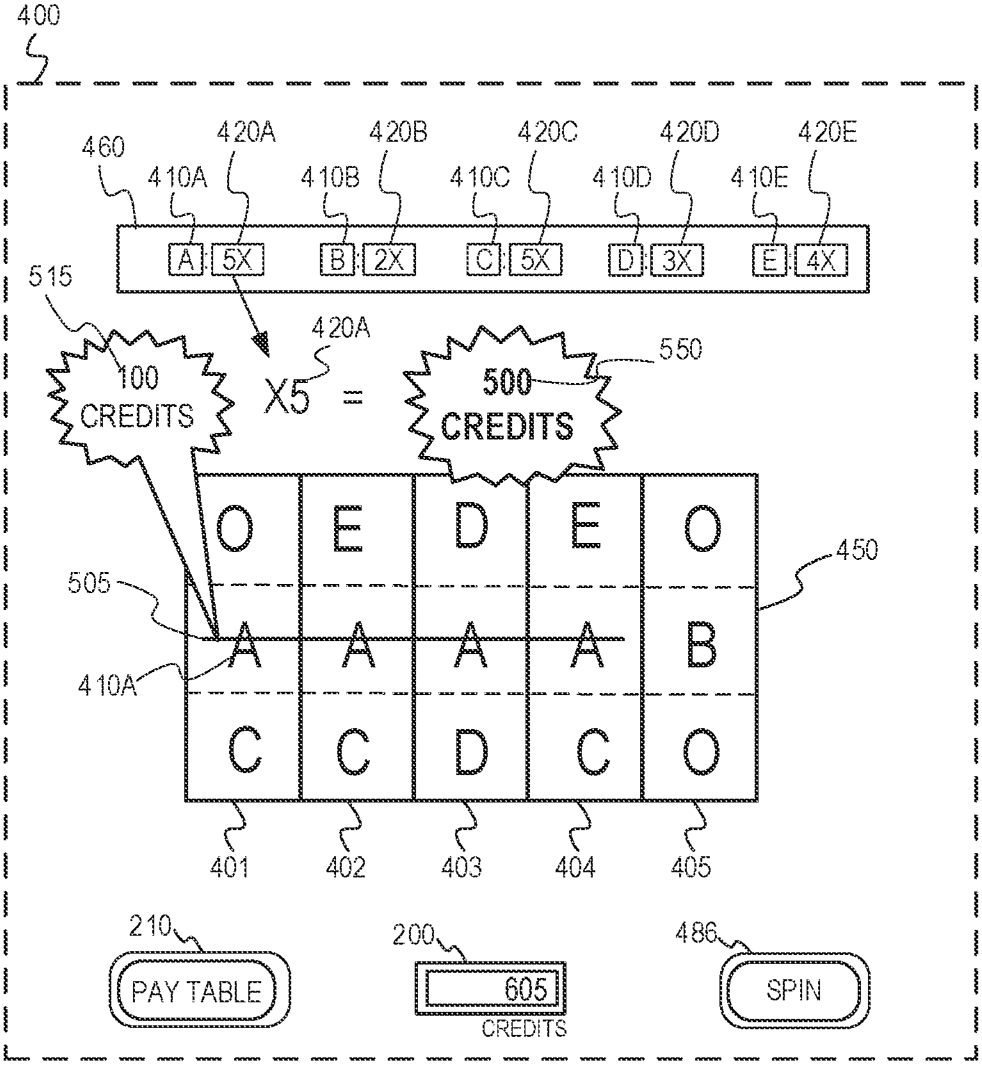
Figure 6:
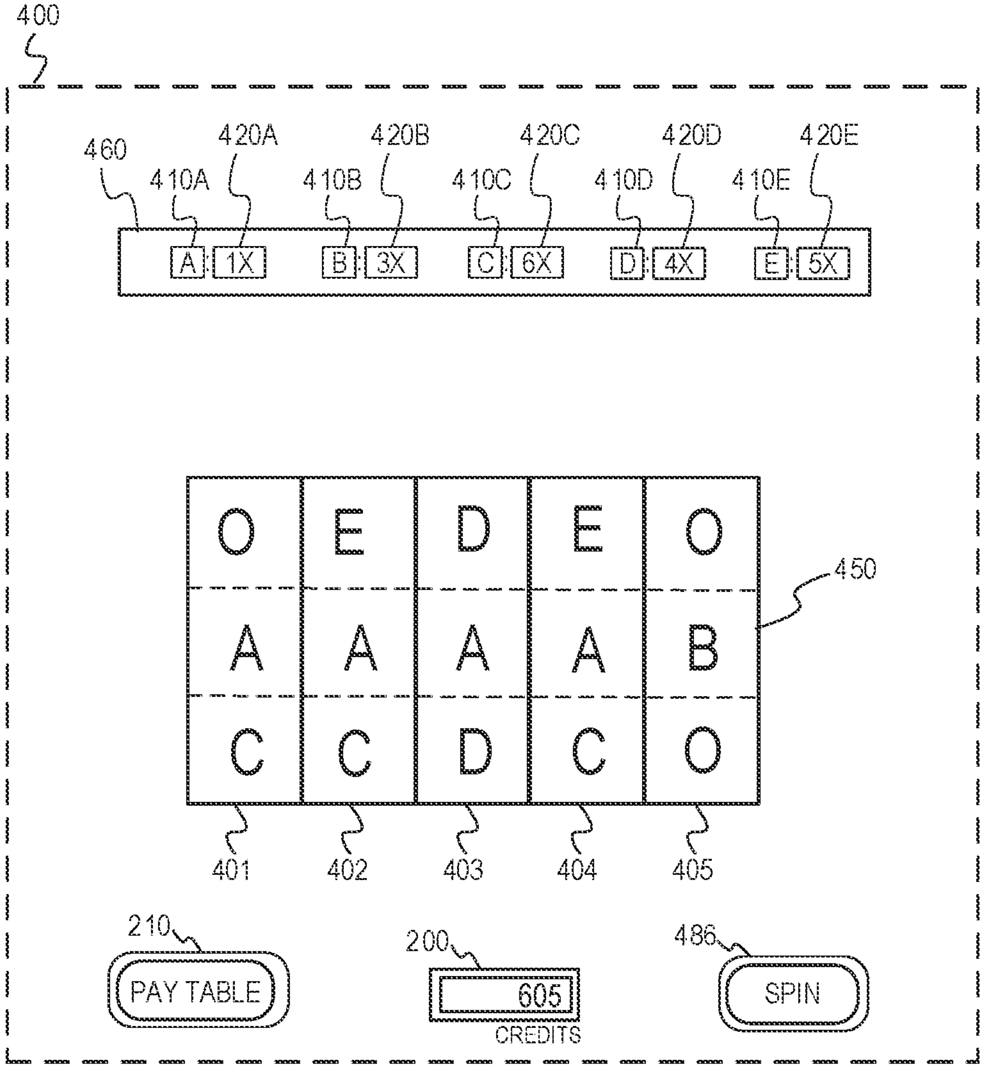
Figure 7:
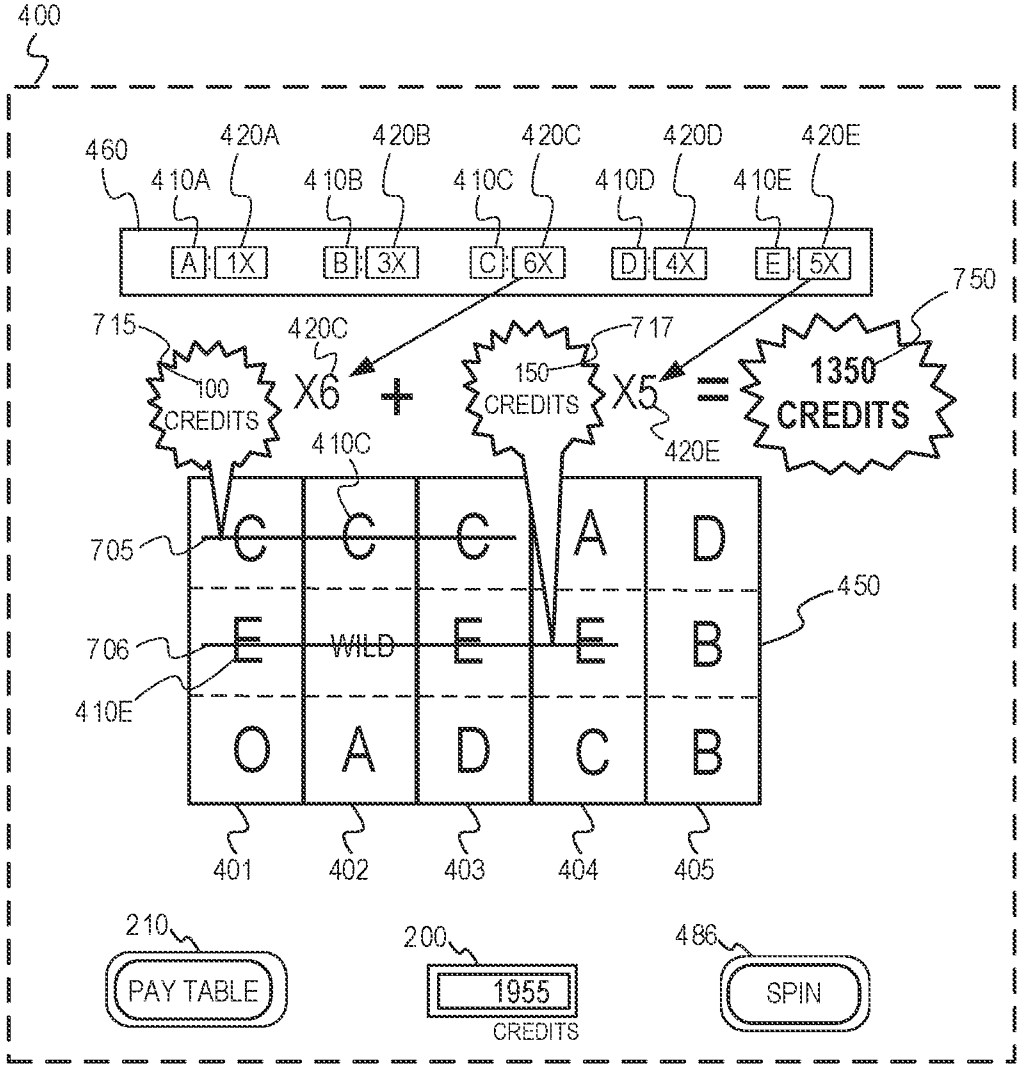
Figure 8:
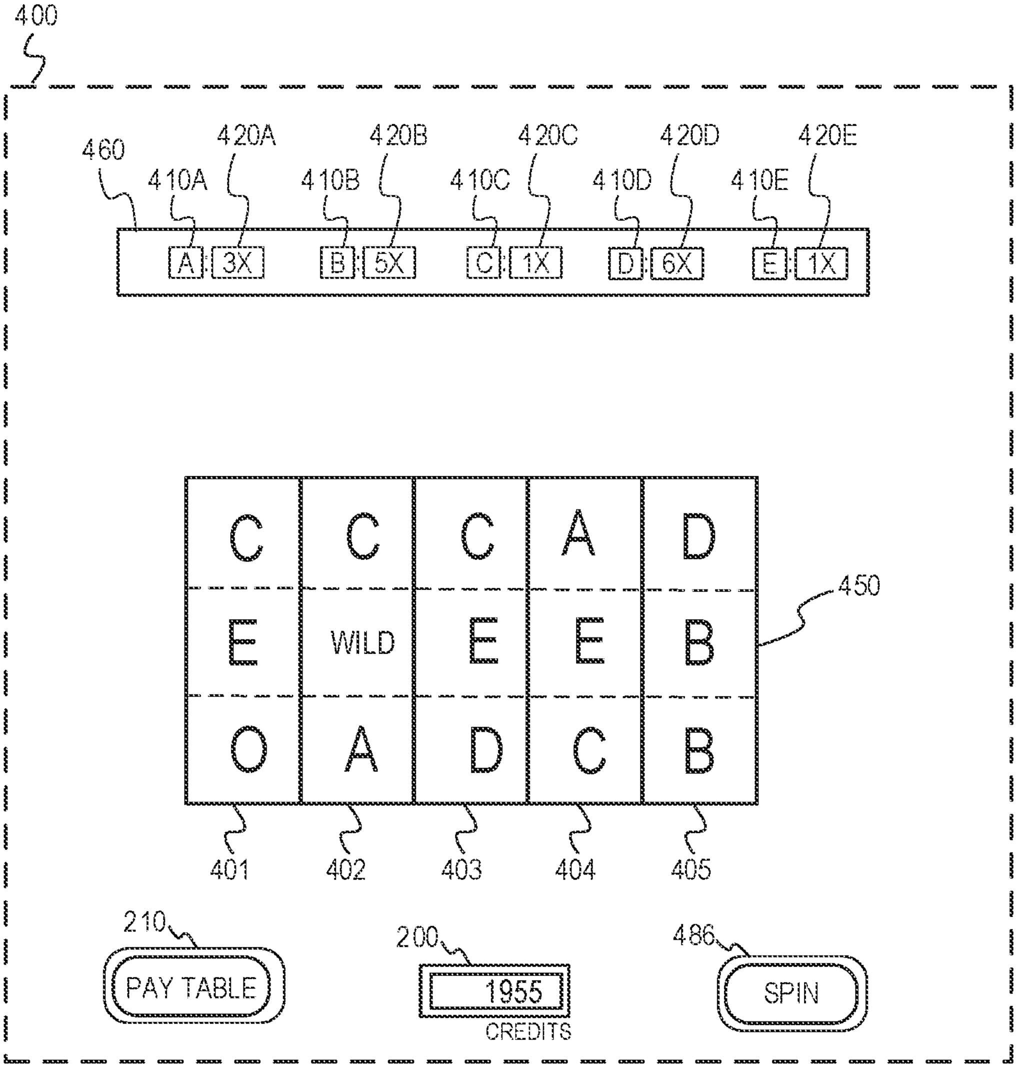
Figure 9:
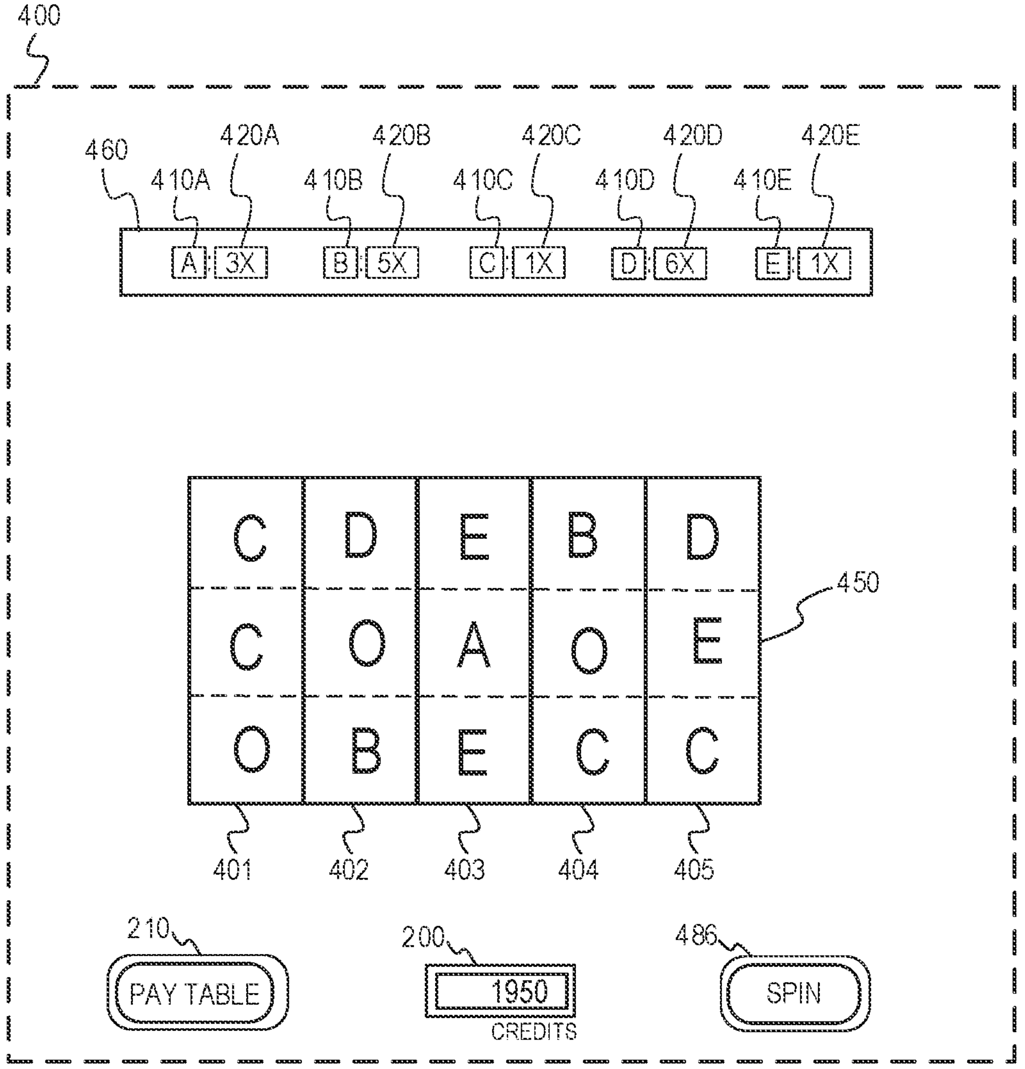

Referring now to FIG. 3, there is shown a flowchart representing one data processing method flow ("flow 300") corresponding to at least some instructions stored and executed by the game-logic circuitry 40 in FIG. 2 to perform operations according to an embodiment of the present invention. The data processing method is described below in connection with an exemplary representation of a series of game cycle outcomes (i.e., "spin outcomes" or "game cycles") as illustrated in FIGS. 4, 5, 6, 7, 8, and 9. For instance, FIG. 4 illustrates an example of a state of a game array (array 450) and a persistent-enhancer table (table 460) before a first game cycle. FIGS. 5 and 6 illustrate an occurrence of the first game cycle (i.e., a first cycle of the flow 300). During the first game cycle a win event occurs (e.g., via the array 450). The game-logic circuitry 40 uses a related persistent enhancer from the table 460 to enhance a game award for the win event, then modifies values of the persistent enhancers (e.g., resets the used persistent enhancer and ratchets up non-used persistent enhancers) for persistence into a second game cycle. FIGS. 7 and 8 illustrate an occurrence of the second game cycle (i.e., a second cycle of the flow 300) that occurs after the first game cycle. During the second game cycle, the game-logic circuitry 40 uses multiple persistent enhancers (from the table 460) to enhance multiple awards for multiple win events, then modifies values of the used persistent enhancers (e.g., resets them) in response to multiple win events in the same game. The game-logic circuitry 40 also modifies the un-used persistent enhancers (e.g., ratchets them up) for persistence into a third game cycle. FIG. 9 illustrates an occurrence of the third game cycle (i.e., a third cycle of the flow 300) that occurs after the second game cycle. During the third game cycle, the game-logic circuitry 40 prevents a change (prevents resetting and/or prevents ratcheting up) of the persistent enhancers in response to a non-win event.

Referring to FIG. 3, the flow 300 commences at processing block 301. At processing block 302, the game-logic circuitry 40 controls one or more presentation devices (e.g., mechanical-reel display device, video display device, or a combination thereof) that present a plurality of symbol-bearing reels and an array of symbol positions. The game-logic circuitry 40 also presents a plurality of persistent enhancers. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the example shown in FIGS. 4, 5, 6, 7, 8, and 9 a presentation device 400 presents a three-by-five array (i.e., array 450) comprising three rows and five columns. Each column is associated with a respective reel (e.g. from the five symbol bearing reels 401, 402, 403, 404, and 405) such that the reel populates the three symbol positions in the associated column. As shown in FIG. 4, the reels 401, 402, 403, 404, and 405 bear a plurality of symbols. The five symbol-bearing reels 401, 402, 403, 404, and 405 are arranged from left to right. The symbol positions in each row of the array 450 are horizontally aligned with each other, and the symbol positions in each column of the array 450 are vertically aligned with each other. The reels 401, 402, 403, 404, and 405 may be associated with the respective columns of the array 450 such that the reels 401, 402, 403, 404, and 405 spin vertically and each reel populates a respective column. The reel spin presents symbol-bearing strips moving vertically across the presentation device 400 and synchronously updating the symbols visible on each strip as the strip moves across the display. In another embodiment, the reels may be associated with the respective rows of the array 450 such that the reels spin horizontally and each reel populates a respective row. In yet another embodiment, the reels may be associated with respective individual symbol positions of the array such that each reel populates only its respective symbol position. Furthermore, although the array 450 illustrates vertical columns and horizontal rows, alternatively, the "rows" of the array may be oriented in a vertical direction, and the "columns" of the array may be oriented in a horizontal direction.

The presentation device 400 also presents the table 460. The table 460 includes a persistent-enhancer set comprising a plurality of persistent enhancers (enhancers 420A-420E). The table also includes an eligible-symbol subset comprising a plurality of subset symbols (subset symbols 410A-410E). Each persistent enhancer in the persistent-enhancer set is paired respectively with a different subset symbol from the eligible-symbol subset (e.g., each separate member of the persistent-enhancer set is paired, in a one-to-one relationship, with a separate subset symbol of the eligible-symbol subset). The pairings may be referred to as enhancer pairs. For example, referring to FIG. 4, the table 460 includes pair 430A which associates the subset symbol 410A (e.g., the symbol "A") with the enhancer 420A (e.g., a multiplier having a current value of "5×"). Other pairs in the table 460 include: pair 430B, which pairs the subset symbol 410B (e.g., the symbol "B") with the enhancer 420B (e.g., a multiplier having a current value of "2×"); pair 430C which pairs the subset symbol 4100 (e.g., the symbol "C") with the enhancer 420C (e.g., a multiplier having a current value of "5×"); pair 430D which pairs the subset symbol 410D (e.g., the symbol "D") with the enhancer 420D (e.g., a multiplier having a current value of "3×"); and pair 430E which pairs the subset symbol 410E (e.g., the symbol "E") with the enhancer 420E (e.g., a multiplier having a current value of "4××").

In some embodiments, the eligible-symbol subset (e.g., subset symbols 410A-410E) is a proper subset of a larger, superset of all possible symbols that may be presented in the game. For example, in FIG. 4, the reels 401, 402, 403, 404, and 405 present, via the array 450, the subset symbols 410A-410E and also one or more additional symbols (e.g., symbol 411). The additional symbol 411 may be used in the game as a symbol that pertains to a potential game outcome, but is not a symbol that is paired with an enhancer from the table 460. Thus, only win events that display the subset symbols 410A-410E are eligible for potential enhancement via the table 460. The table 460 is used for enhancement of an award for a winning symbol combination that uses at least one of the subset symbols 410A-410E. Thus, the table 460 is not a pay table for the underlying game (also referred to herein as the base game). The pay table for the base game (e.g., accessible via user-input of the button 210) includes information that relates the game symbols to possible winning outcomes of the base game. The game-logic circuitry 40, for instance, is configured to compute one or more winning award values for the base game based on a game outcome, then determine if the one or more winning awards is based on (i.e., displays) a winning symbol combination that uses one of the subset symbols 410A-410E. The game-logic circuitry 40 is configured further to apply an enhancer to an award that used the subset symbol.

In some embodiments, the eligible-symbol subset consists of subset symbols that match up with, or represent, unique aspects of game-play objects. The game-play objects may include randomizing devices, and/or outcome-determinant game elements used to determine an outcome of the game (according to game rules, a pay table, etc.). For instance, the game-play objects may include a die or dice, a playing card, a roulette wheel, a slot reel, etc. In some embodiments, the unique aspects of the game-play objects may include different visible characteristics of the game-play objects, such as side or value on a die, a face value (e.g., rank and/or suit) of a card, a number value on a roulette wheel, a type of bet made in a roulette game, specific section or betting option on a betting layout for a roulette game, a slot symbol on a slot reel, an entry/location in a picking grid, a specific color, a specific shape, a specific number, etc.

Each of the enhancers (e.g., 420A-420E) includes a value that can persist, or remain, with the enhancer across one or more game cycles, and which can change based on whether a win event or a non-win event occurs for a given game cycle. For example, the persistent enhancers may be multipliers associated with each subset symbol. If a subset symbol appears as a winning symbol in the array 450 (e.g., a displayed subset symbol that is part of a winning outcome, as in FIG. 5), then the game applies the current value of the paired persistent enhancer to the award of the resulting win outcome (e.g., the game-logic circuitry 40 applies the multiplier, paired with the winning subset symbol, to the credit payout for the winning outcome related to the winning subset symbol). In some embodiments, for instance, after applying a multiplier to a payout, the game resets the multiplier to a default minimum level (e.g., 1×) (e.g., see FIG. 6). Further, for other multipliers that were not part of a winning outcome, then the game can ratchet up or increment the multiplier (e.g., the game increments all of the listed multipliers that are associated with non-winning ones of the subset symbols) (e.g., see FIG. 6). The game can then use the incremented multipliers for a subsequent game (e.g., see FIGS. 8 and 9).

In some embodiments, as in FIG. 4, the persistent enhancers are multipliers. However, multipliers are only one kind of enhancer. The enhancers can be any game object that can store and/or impart a specific enhancing value to a game award. Some enhancers (also referred to herein as enhancement features) include, but are not necessarily limited to, a multiplier, an adder (e.g., to add a credit value to an award), a re-spin feature, a free-game trigger, a jackpot, a jackpot upgrade, an additional persistent symbol, a pay table upgrade, etc.

The game-logic circuitry 40 can utilize multiple enhancer sets. For example, in some embodiments, different bet levels have different associated enhancer sets. For instance, a first bet level (e.g., a minimum bet level) has a first enhancer set with first values (associated with the enhancers) that are used only for the first bet level. If, during a second game, the player changes the bet amount to a second bet level (e.g., a maximum bet level), the game switches to a second enhancer set having second values used only for the second bet level. The game, however, stores in memory the enhancer values of the first enhancer set so that if the player switches back to the first bet level (in a subsequent game), then the second enhancer set would get stored in memory (for a later use), and the first enhancer set would be loaded and used for the first bet level.

Furthermore, in some embodiments, upon initial configuration of the game, the game can start with pre-set multipliers. In sonic embodiments, the pre-set multipliers may be all one value (e.g., a default minimum value, such as "1×"), whereas in other embodiments pre-set multipliers may be a combination of different values (e.g., not all "1×"). In some embodiments, the game-logic circuitry 40 can create initial pre-set values for multipliers to be the theoretical average values of the multipliers.

Referring again to FIG. 3, at processing block 304, the game-logic circuitry 40 detects, via at least one of one or more electronic input devices, a physical item associated with a monetary value that establishes a credit balance. In some embodiments, the physical items is a ticket having a credit balance stored thereon. As shown in FIG. 4 a credit balance (e.g., "110" credits) may be detected (e.g., from the ticket) and transferred to the credit meter 200.

Referring again to FIG. 3, at processing block 306, the game-logic circuitry 40 initiates a wagering game cycle in response to an input indicative of a wager covered by the credit balance. To initiate a spin of the reels, the player may press a "Spin" or "Max Bet" key on a button panel or touch screen (e.g., the spin button 486).

At processing block 308, the game-logic circuitry 40 spins and stops the reels to randomly land symbols from the reels in the array. The reel spin may be animated on a video display by depicting symbol-bearing strips moving vertically across the display and synchronously updating the symbols visible on each strip as the strip moves across the display. For example, in response to a player pressing the spin button 486, the game-logic circuitry 40 causes the reels 401, 402, 403, 404, and 405 to being spinning. When the reels stop, the symbols land in visual association with one or more paylines (also known as lines, ways, patterns, or arrangements). The game-logic circuitry 40 is configured to evaluate the presented array of symbols and provide awards and bonus games in accordance with a pay table. The pay table may, for example, include "line pays" or "scatter pays." Line pays occur when a predetermined type and number of symbols appear along an activated payline, typically in a particular order such as left to right, tight to left, top to bottom, bottom to top, etc. Scatter pays occur when a predetermined type and number of symbols appear anywhere in the displayed array without regard to position or paylines. Similarly the wagering game may trigger bonus games based on one or more bonus triggering symbols appearing along an activated payline (i.e., "line trigger" or anywhere in the displayed array (i.e., "scatter trigger"). The wagering game may also provide mystery awards and features independent of the symbols appearing in the displayed array. Each payline preferably consists of a single symbol position in each column of the array. The number of paylines may be as few as one or as many as possible given each payline consists of a single symbol position in each column of the array. In a 3×5 array with three rows and five columns, the maximum number of such paylines is $3^5$=243 lines. In some embodiments, the game-logic circuitry 40 determines awards based on a pre-configured subset of the possible paylines.

At processing block 310, the game-logic circuitry 40 determines, in response to the presenting the random selection of the plurality of symbols in the array, whether a win event occurs having a displayed winning subset symbol (or which matches an attribute of the subset symbol, such as a shared color). If a win event occurs, then the flow 300 continues at processing block 312 (e.g., see FIGS. 5 and 6 or FIGS. 7 and 8). If no win event occurs the flow 300 continues at processing block 330 (e.g., see FIG. 9).

Referring still to FIG. 3, if a win event occurs at processing block 310, the flow continues at processing block 312 where the game-logic circuitry 40 begins a first loop (e.g., a first "for" loop). In the first loop, at processing block 314, the game-logic circuitry 40 enhances an award for the win event using an associated enhancer. Multiple awards may occur in the same game cycle (e.g. multiple winning symbol combinations can appear in the array 450), thus the game-logic circuitry 40 runs the first loop for each win event. FIG. 5 illustrates an example of running the first loop one time for a single win event during the first game cycle. FIG. 7 illustrates an example of running the first loop twice for two win events that occur during the second game cycle.

It should be noted that a win event can occur in one of many known ways. For instance, the win event can be a line win, a cash-on-reels wins, a ways wins, etc. Examples of win events include, but not limited to: a dice roll occurs having face values that add to specific winning number (e.g., the dice face values represent the symbols), a card hand occurs with specific winning card combination (e.g., the card values represent the symbols), a slot game presents a reel-stop combination with a minimum number of the same slot symbol in a winning configuration (e.g., 3 or more of the same slot symbol in a row, in a payline, etc.), and so forth.

Referring to FIG. 5, the game-logic circuitry 40 detects that a win event occurs having a winning combination of the subset symbol 410A within the second row of the array 450. The win event is graphically highlighted by the payline indicator 505. The game-logic circuitry 40 detects that the win event, for the first game cycle, has a base game award 515 (determined based on the game pay table, game rules, attributes or values pertaining to a number or type of winning symbol, etc.). The game-logic circuitry 40 determines that the winning subset symbol 410A is associated with (e.g., paired with) the enhancer 420A in the table 460. The game-logic circuitry 40 determines a current value for the paired enhancer 420A (e.g., the value of "5×") and applies the current value to the award. For example, the game-logic circuitry 40 multiplies the award value 515 with the current value of the paired enhancer 420A, to compute (as a product) the overall payout 550. The game-logic circuitry 40 adds the overall payout 550 to the credit meter 200.

Referring again to FIG. 3, after the first loop, the game-logic circuitry 40 performs (during the same game cycle) two additional loops (which can be performed in parallel) that modify the enhancer values in the table 460 for persistence to a subsequent game cycle. The game-logic circuitry 40 performs the second loop (comprising processing blocks 318, 320, and 322) for each used enhancer (e.g., for each enhancer that was used in the first loop to enhance an award for the current game cycle). For instance, in one embodiment, in the second loop the game-logic circuitry 40 resets, at processing block 320, the used enhancer value (e.g., resets a used multiplier to a default minimum value, such as "1×"). The game-logic circuitry 40 performs the third loop (comprising processing blocks 324, 326, and 328) for each un-used enhancer (e.g., for each enhancer that was not associated with a winning event for the current game cycle, and thus was not used during the first loop). For instance, in the third loop the game-logic circuitry 40 ratchets up (e.g., increments), at processing block 326, the un-used enhancer value (e.g., ratchets up each un-used multiplier's value by one or more levels). FIG. 6 illustrates an example where the game-logic circuitry 40 performs the second loop once (to reset the value for the one enhancer 420A related to the winning subset symbol 410A for the first game cycle) and performs the third loop four times (to increment the values of the four enhancers 420B-420E related to the four non-winning, subset symbols 410B-410E). FIG. 8 illustrates an example where the game-logic circuitry 40 performs the second loop twice (to reset the value for the two enhancers 420C and 420E related to the winning subset symbols 410C and 410E) and performs the third loop three times (to increment the values of the three enhancers 420A, 420B, and 420D related to the three non-winning, subset symbols 410A, 410B, and 410D).

Referring to FIG. 6, the game-logic circuitry 40 reduces the value of the used enhancer (i.e., enhancer 420A) to a default value (e.g., sets the multiplier value to "1×"). The game-logic circuitry 40 also ratchets up the values of the un-used enhancers (i.e., enhancers 420B-420E) for persistence to the second game cycle. For example, the enhancer 420B increments from the previous value of "2×" to a new value of "3×;" the enhancer 420C increments from the previous value of "5×" to a new value of "6×;" the enhancer 420D increments from the previous value of "3×" to a new value of "4×;" and the enhancer 420E increments from the previous value of "4×" to a new value of "5×."

In some embodiments, the game-logic circuitry 40 can prevent, or refrain from, ratcheting up any given enhancer values if the enhancer values has reached an increment limit. For example, the game-logic circuitry 40 can determine whether the enhancer has reached a maximum amount (e.g., a limit of "100×"). If so, then the game-logic circuitry 40 prevents ratcheting up the un-used enhancer beyond the limit (e.g., prevents incrementing a multiplier beyond a "100×" value). Instead, the game-logic circuitry 40 would increment only those of the un-used enhancers that are below the limit.

In some embodiments, the game-logic circuitry 40 can ratchet up some, or all, values of un-used enhancers by more than a minimal increment level. For instance, the game-logic circuitry 40 can increment a multiplier value by more than "1×." In one example, the game-logic circuitry 40 can also increment enhancer values by tiers (e.g., by "10×" instead of by "1×"). In some embodiments, the game-logic circuitry 40 can set increment levels based on one or more of: game rules, current game data, a specific game or player history (e.g., increment by higher tier if a maximum bet is placed for the current game cycle); appearance of a special symbol (e.g., if a special symbol appears in the array 450 during a win event, then the increment level increases to a higher tier (e.g., "10×" increment level), otherwise increment by a minimum, or default tier (e.g., "1×" increment level)); etc. In some embodiments, the game-logic circuitry 40 can use a random increment level. Further, in some embodiments, game-logic circuitry 40 can utilize a combination of different tiers or levels, such as incrementing by a first increment level (e.g., increment by "1×") until the enhancer value has reached a first limit (e.g., until the enhancer value has reached a "10×" value), then switching to a second increment level (e.g., increment by "5×") until the enhancer value has reached a second limit (e.g., until the enhancer has reached a "30×" value), then switching to a third increment level (e.g., increment by "10×") until the enhancer value has reached a third limit (e.g., until the enhancer has reached a "60×" value), and so forth until the enhancer value reaches a maximum limit (e.g., until reaching a value of "100×.")

Referring again to FIG. 3, at processing block 332, the game-logic circuitry 40 determines whether or not it has received a cashout input via at least one of the one or more electronic input devices of the gaming machine. If it has not received a cashout input, the game-logic circuitry 40 waits for the next wager input at processing block 306. If it has received a cashout input; the game-logic circuitry 40 initiates a payout from the credit balance on the credit meter. The data processing method then ends at processing block 334.

As mentioned, FIGS. 7 and 8 illustrate an example of when multiple win events occur in a given game cycle. In FIG. 7, the game-logic circuitry 40 applies multiple enhancers for multiple winning events that occur during the second game cycle. In some embodiments, as in FIG. 7, two win events occurs: one win event for the subset symbol 410C (e.g., the symbol "C") and one win event for the subset symbol 410E (e.g., the symbol "E"). For the first win event a first payline indicator 705 appears. For the second win event a second payline indicator 706 appears. For the first win event, the game-logic circuitry 40 computes a first award subtotal for the first winning subset symbol 410C (e.g., "C"). The first award subtotal comprises a product of the base-game award 715 for the first win event (e.g., "100" credits) multiplied by the current value (e.g., "6×") of the paired enhancer 420C. More specifically, the game-logic circuitry 40 detects, for the first win event, the base-game award 715 for the combined appearance of three instances of the subset symbol 410C in the top row of the array 450. The game-logic circuitry 40 then multiplies the base-game award 715 by the current value of the paired enhancer 420C (i.e., multiplies the "100" credits by the "6×" value) resulting in the first award subtotal. The first award subtotal may also be referred to as a first enhanced award. Likewise, for the second win event, the game-logic circuitry 40 determines a second award subtotal for the second winning subset symbol 410E (e.g., "E"). The second award subtotal comprises a product of the base-game award 717 for the second win event (e.g., "150" credits) multiplied by the current value (e.g., "5×") of the paired enhancer 420E. More specifically, the game-logic circuitry 40 detects, for the second win event, the base-game award 717 for the combined appearance of three instances of the subset symbol 410E and the Wild symbol in the middle row of the array 450. The game-logic circuitry 40 then multiplies the base-game award 717 by the current value of the paired enhancer 420E (i.e., multiplies the "150" credits by the "5×" value) resulting in the second award subtotal. The second award subtotal may also be referred to as a second enhanced award. The game-logic circuitry 40 combines the first enhanced award and the second enhanced award (e.g.; the game-logic circuitry 40 adds up the first award subtotal and the second award subtotal) resulting in an overall payout 750, which the game-logic circuitry 40 then adds to the credit meter 200.

In some embodiments; the game-logic circuitry 40 determines whether there are multiple win events per each subset symbol. For instance, there may be multiple awards for the same subset symbol (e.g., two separate paylines in the same game cycle for the same subset symbol "A" each having a separate award amount). If there are multiple win events for the given symbol, the game-logic circuitry 40 adds up the individual base-game awards for a winning subset symbol, resulting in a subset-symbol award subtotal for the multiple awards. The game-logic circuitry 40 then applies the paired enhancer for that specific subset symbol to the subset-symbol award subtotal resulting in an enhanced award (e.g., the game-logic circuitry 40 multiplies the current value of the enhancer 420A to the subset-symbol subtotal for the winning subset symbol "A," resulting in an enhanced award amount for the subset symbol "A"). The game-logic circuitry 40 does the same for all other winning subset symbols, (i.e., generates a subset-symbol award subtotal and applies the paired enhancer for that respective winning subset symbol to generate an enhanced award amount for that winning subset symbol). The game-logic circuitry 40 then adds up the enhanced award amounts into an overall payout, which the game-logic circuitry 40 then adds to the credit meter.

Referring to FIG. 8, after applying the relevant enhancers (e.g., after using the enhancers 420C and 420E to generate the overall payout 750), the game-logic circuitry 40 modifies the enhancers 420A-420E in the table 460 for persistence into the third game cycle. For instance, the game-logic circuitry 40 resets the values of the used enhancers 420C and 420E (e.g. resets 420C to a default minimum value of "1×" and resets 420E to a default minimum value of "1×"). The game-logic circuitry 40 also ratchets up (e.g., increments) the values of the un-used enhancers 410A, 420B, and 420D (e.g., ratchets up each un-used multipliers value by one or more levels).

In some embodiments, the increment level for un-used enhancers can depend on the number of winning subset symbols that occurred for that given game cycle. More specifically, in one example, the game-logic circuitry 40 can increment un-used enhancers proportional to a number ("N") of the subset symbols (in the table 460) that also appeared in winning game events for the given game cycle. For instance, regarding FIG. 8, the game-logic circuitry 40 determines that two of the subset symbols (i.e., subset symbol 410C and subset symbol 410E) appeared in winning events (as was shown in FIG. 7). Thus, as shown in FIG. 8, the game-logic circuitry 40 increments each of the un-used enhancers (i.e., the enhancers 420A, 420B, and 420D) by two (which is proportional in number to the two subset symbols 410C and symbol 410E that were used and reset). For example, the game-logic circuitry 40 increments the enhancer 420A from the previous value of "1×" to a new value of "3×;" the game-logic circuitry 40 increments the enhancer 420B from the previous value of "3×" to a new value of "5×;" and the game-logic circuitry 40 increments the enhancer 420D from the previous value of "4×" to a new value of "5×."

Referring to FIG. 9, during the third game cycle the game-logic circuitry 40 detects that no win event occurs. For instance, the game-logic circuitry 40 detects that none of the subset symbols 410A-410E appeared in a winning combination of symbols within the array 450. In response, the game-logic circuitry 40 prevents the values of the enhancers 420A-420E from changing. Thus, the values of the enhancers 420A-420E remain at their current values and persist, as is, for a fourth game cycle (not shown).

In addition to the embodiments already described, the following paragraphs describe additional embodiments.

Figure 10A:
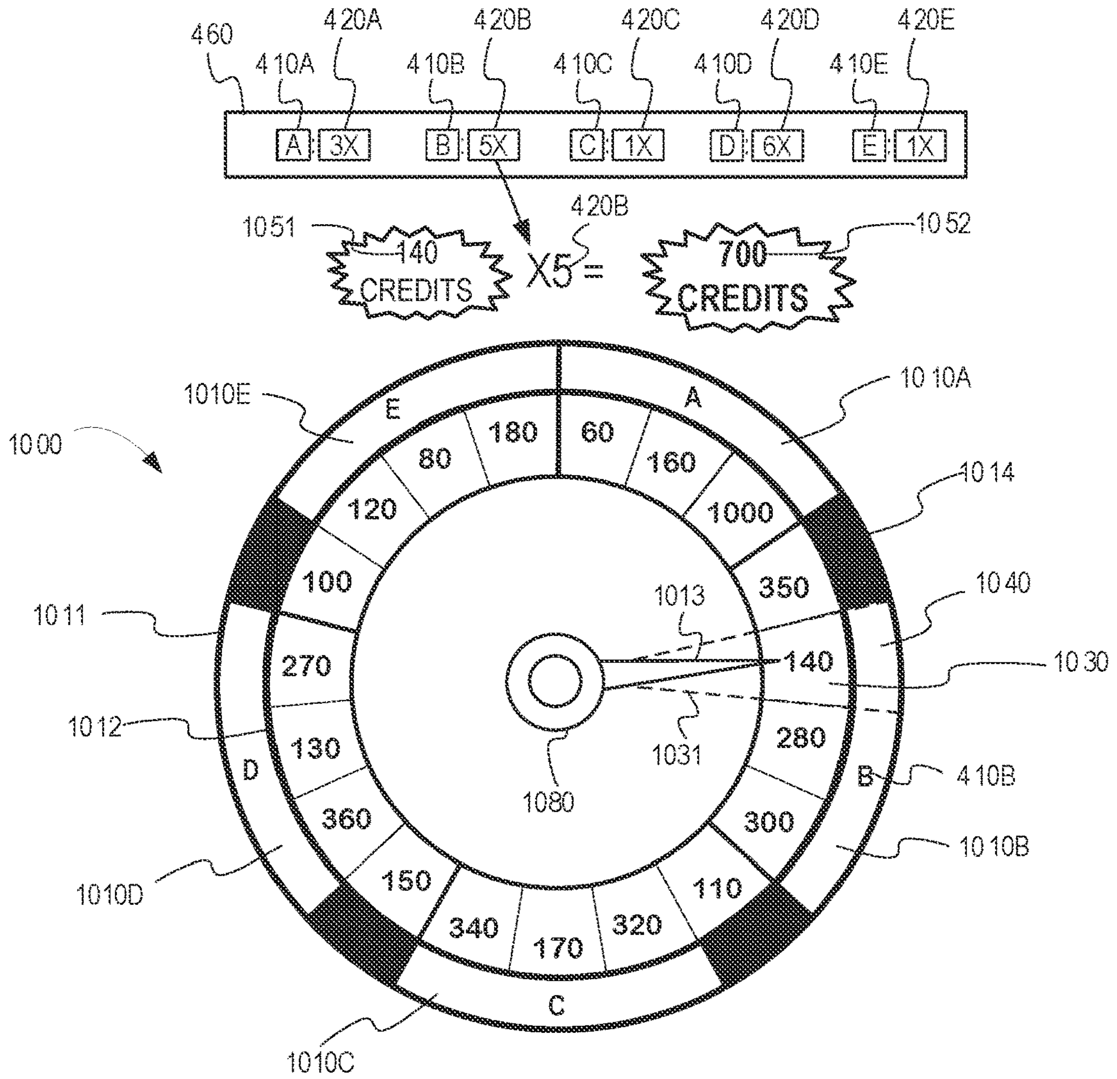
FIGS. 10A and 10B are diagrams of one or more embodiments of the present invention.

In some embodiments, the game-logic circuitry 40 uses different types of symbols and/or configurations for presenting and applying the enhancement feature. For instance, FIG. 10A illustrates one example of a wheel apparatus 1000 that can be used for the enhancement feature. Referring to FIG. 10A, two concentric rings, ring 1011 and ring 1012 are attached to the wheel apparatus 1000. The ring 1011 includes sections 1010A-1010E that are associated respectively with the subset symbols 410A-410E from the table 460. The ring 1012 includes credit-value sections, each credit-value section bearing a credit value. For example, credit-value section 1013 bears the credit value of "140" credits. A selector 1013 is attached to a center 1080 of the wheel apparatus 1000. The selector 1013 is configured to select a wedge (e.g., wedge 1031) that extends from the center 1080 to an outer edge of the ring 1011. The wedge includes one of the credit-value sections (e.g., credit-value section 1030) as well as a portion of one of the sections 1010A-1010E (e.g., the wedge 1031 includes the credit-value section 1030 as well as portion 1040 of the section 1010B). In one embodiment, the ring 1011 is attached to a first wheel and the ring 1012 is attached to a second wheel. The first and second wheel are both attached to the center 1080, and thus can rotate independent of each other around the same central point. In other embodiments, the ring 1011 and the ring 1012 are affixed to the wheel apparatus 1000 and do not rotate independent of each other. Further, in some embodiments, the selector 1013 is configured to rotate around the center 1080.

When the wheel apparatus 1000 spins (or when the selector 1013 spins), the game-logic circuitry 40 randomly selects a winning wedge (e.g., wedge 1031). When the wheel apparatus 1000 stops, if the winning wedge is associated with one of the subset symbols (e.g., wedge 1031 is associated with the portion 1040 of the section 1010B for the subset symbol 410B), then the game-logic circuitry 40 applies the paired persistent enhancer (e.g., enhancer 420B)

to an award associated with the wedge 1031. For instance, the game-logic circuitry 40 detects that the selector 1013 selects the wedge 1031. In response, the game-logic circuitry 40 multiplies an award value 1051 from the wedge 1013 (i.e., the "140" credits from the credit-value section 1030) by the current value of the enhancer 420B (i.e., by the "5×" value), thus generating an overall payout 1052 (which is then added to a credit meter). Furthermore, the game-logic circuitry 40 also modifies the values of the enhancers 420A-420E based on the win event. For example, the game-logic circuitry 40 can reset the value of the enhancer 420B to a default minimum value (e.g., to "1×") after being used to enhance the win event. The game-logic circuitry 40 can also ratchet up other ones of the persistent enhancers that were associated with non-winning wedges (e.g., the game-logic circuitry 40 increments the values of the un-used enhancers 420A, 420C, 420D, and 420E).

In some embodiments, the ring 1011 may include non-eligible portions 1014. If a non-eligible portion 1014 is included in a wedge, then the game-logic circuitry 40 does not use/apply any of the enhancers 420A-420E. Further, if none of the enhancers 420A-420E are used, the game-logic circuitry 40 does not increment any of the enhancers 420A-420E.

In some embodiments, the symbols 410A-410E may be colors, Specific wedges can be assigned to the different colors. Thus, in some embodiments, instead of having the ring 1011, the ring 1012 displays different colors in each credit-value section. The different colors can map to the subset symbols 410A-410E.

Figure 10B:
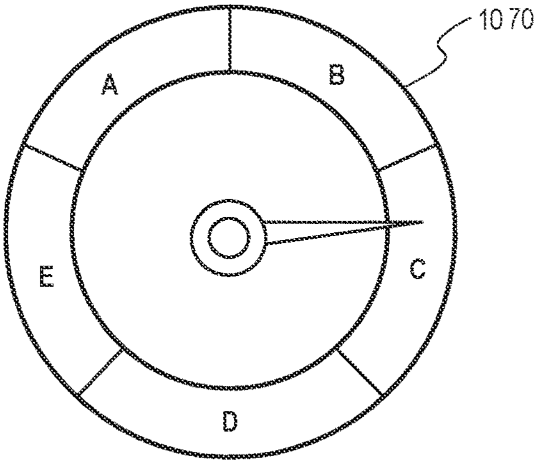

In some embodiments, instead of using two concentric wheels attached to the same central point (as illustrated in FIG. 10B), the game-logic circuitry 40 can utilize two separate devices, such as two separate wheels. For instance, the game-logic circuitry 40 can present a first wheel that includes only credit values (e.g., a first wheel that includes the credit-value sections in the ring 1012). After the first wheel is spun, a credit amount from the first wheel may be selected as a credit amount of a winning event. The game-logic circuitry 40 then presents a secondary selection device (e.g., a separate, second wheel) such as the wheel 1070 shown in FIG. 10B. The wheel 1070 can be spun to select a subset symbol presented thereon. In some embodiments, instead of a wheel, the secondary selection device can be a picking grid that includes, within one or more cells of the grid, a subset symbol.

One or more embodiments of the enhancement feature can be utilized for a base game mechanic or for a bonus feature mechanic. For example, the enhancement feature can be used in a slot-style base game similar to that described for FIG. 4-9 as well as in one or more bonus rounds associated with the slot game. Further, the enhancement feature can be used in a bonus round using the wheel apparatus 1000 in FIG. 10A or the wheel 1070 in FIG. 10B. In some embodiments, the game-logic circuitry 40 performs the enhancement feature in a bonus round differently than in the base game. For example, the bonus round can utilize the values of the persistent enhancers that have accrued in the enhancer set during the base game. In one example, the bonus round can lock-in (i.e., store in memory) the current persistent enhancer values and use only the locked-in values. In other examples, the bonus game can change (e.g., reset and/or increment) the persistent enhancer values during the bonus game and can use the changed persistent enhancer values when the base game resumes. In some embodiments, the bonus game can reset values to the locked-in values (e.g., the reset values in the bonus game are no lower than the locked-in values).

In some embodiments, enhancers can be combined. For example, two or more subset symbols may be related to one win event. For instance, colors may be a type of subset symbol of the eligible-symbol subset (e.g., the subset includes "red," "yellow," "green," "blue," and "purple" symbols). If two (or more) different subset colors are presented as part of a winning symbol combination game (e.g., one win event includes both "red" and "green" symbols), the game-logic circuitry 40 can combine the paired enhancer values and use the combined enhancer values to enhance an award for the win event. For instance, if the "red" subset symbol is paired with a multiplier that has a "5×" value and if the "green" subset symbol is paired with a multiplier that has a "10×" value, then the game-logic circuitry 40 can combine (e.g., add) the "5×" multiplier value with the "10×" multiplier value, resulting in a "15×" multiplier value. Thus, the game-logic circuitry 40 multiplies the award for the win event by the "15×" value. Adding enhancer values is only one way of combining values. For instance, enhancer values can also be multiplied by each other or some combination of adding and/or multiplying if a win event includes two different subset symbols, as well as a special symbol, such as a Wild symbol, then the game-logic circuitry 40 multiplies the combined values of the paired enhancers, otherwise if no special symbol appeared then the game-logic circuitry 40 would only add the combined values of the paired enhancers). In another example, the game may include a wheel (e.g., as in FIG. 10A or 10B). A wheel wedge may be multi-colored, thus can apply to multiple persistent enhancers. If the multi-colored wheel wedge is selected, then the persistent enhancer can be combined (e.g., added or multiplied together) and the result of the combination (e.g., the sum or product of the multiplier values) is then applied to (e.g., multiplied with) the winning base-game award.

In some embodiments, the enhancement feature can be localized to a specific part or section of a playing area. For example, persistent enhancers can be associated with specific reels, columns, rows, or other areas of a playing area (e.g., sections of a picking grid, wedges of a wheel, etc.). For example, a persistent enhancer may be tied to a specific reel. If the reel is associated with a win event (e.g., a subset symbol on the reel is displayed as part of a win outcome), then the game-logic circuitry 40 can enhance an award for the win event using the persistent enhancer for the particular reel and/or modify that enhancer's value after being used (and not modify enhancer values for other, non-used enhancers). In another example, a persistent enhancer may be tied to a specific reel, and the persistent enhancer value represents a number of Wild symbols on a specific reel. If the Wild symbol is used as a winning symbol, then the set of Wild symbols for the particular reel can reset to a default value and the number of wild symbols on the other reels ratchets up/increments.

In some embodiments, the enhancement feature modifies a frequency or number of instances of a certain subset symbol as opposed to increasing a payout value for a winning symbol. For example, the game can add more instances of the subset symbol to a reel, thus increasing the chance that the subset symbol will appear in a winning combination in a subsequent game.

In another embodiment, the enhancement feature can be applied to a mystery symbol (e.g., a morphing symbol that can turn into other symbols). For example, a persistent enhancer value represents an increase to a default amount of time that the mystery symbol remains available (e.g., the persistent enhancer can increase the time in which the mystery symbol can morph into a possible winning subset symbol).

Some embodiments of the inventive subject matter may take the form of an entirely hardware embodiment, an entirely software embodiment (including firmware, resident software, micro-code, etc.) or an embodiment combining software and hardware aspects. Furthermore, some embodiments may take the form of a computer program product embodied in any tangible or non-transitory medium of expression having computer readable program code embodied in the medium. The described embodiments may be provided as a computer program product that may include a computer-readable storage medium having stored thereon instructions, which may be used to program a computer system to perform a process according to some embodiments(s), whether presently described or not, because every conceivable variation is not enumerated herein. A computer-readable storage medium includes any mechanism that stores information in a form (e.g., software, processing application) readable by a machine (e.g., a computer). For example, computer-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A method comprising:

presenting, by a presentation assembly, an array associated with a plurality of symbol-bearing reels, wherein the plurality of symbol-bearing reels bear game symbols for a game;

animating, by the presentation assembly prior to a first game cycle of a plurality of game cycles for the game, a set of persistent ratcheting enhancement objects paired, via a persistent-enhancer table presented via a display of a gaming machine, with a subset of the game symbols, wherein each one of the set of persistent ratcheting enhancement objects is paired respectively with a separate game symbol of the subset of the game symbols, and wherein a respective value for each one of the set of persistent ratcheting enhancement objects is configured to persist, via the display, across the plurality of game cycles;

using a random number generator, spinning and stopping the plurality of symbol-bearing reels for the first game cycle, to populate the array with a portion of the game symbols;

accessing at least one pay table stored in a memory device and animating based on the at least one pay table an indication of occurrence of one or more win events that use a given game symbol from the subset of the game symbols;

animating for each of the indicated one or more win events, by game-logic circuitry via the display in response to the animating the indication of occurrence of the one or more win events, an enhancement of one or more award values of the one or more win events using one of the set of persistent ratcheting enhancement objects that is paired respectively with the given game symbol;

in response to animating the enhancement, animating a reset, by the game-logic circuitry via the display, of the one of the set of persistent ratcheting enhancement objects to a default value; and animating, by the game-logic circuitry via the display, an increment of each respective value depicted via each of one or more other ones of the set of persistent ratcheting enhancement objects that were not used for animating an enhancement of an award in the first game cycle, wherein the incremented respective value of each of the one or more other ones of the set of persistent ratcheting enhancement objects persists, via the display, to a second game cycle subsequent to the first game cycle.

2. The method of claim 1 further comprising:

using the random number generator, spinning and stopping the plurality of symbol-bearing reels for a second game cycle of the plurality of game cycles, to populate the array with another portion of the game symbols;

detecting, in response to the randomizing in the second game cycle, no occurrence of a win event associated with any one of the subset of the game symbols;

preventing modification to the values of the persistent ratcheting enhancement objects in response to detecting that no occurrence of a win event occurs, wherein the values of the set of persistent ratcheting enhancement objects persist for use in a third game cycle subsequent to the second game cycle.

3. The method of claim 1, wherein the set of persistent ratcheting enhancement objects comprises a set of multipliers, wherein each multiplier in the set of multipliers has an independent value from any other multiplier in the set of multipliers.

4. The method of claim 3, wherein animating the reset of the one of the set of persistent ratcheting enhancement objects to the default value comprises animating a reset of an associated multiplier value to 1X.

5. The method of claim 1, wherein the animating the enhancement of the one or more awards of the one or more win events using the one of the set of persistent ratcheting enhancement objects, comprises:

enhancing, by the game-logic circuitry via the display using a first persistent ratcheting enhancement object, a first award for a first win event, wherein a first winning game symbol for the first win event matches the given game symbol, which is a first subset symbol from the one or more of the subset of the game symbols, wherein the first subset symbol is paired with the first persistent ratcheting enhancement object;

enhancing, by the game-logic circuitry via the display using a second persistent ratcheting enhancement object, a second award for a second win event, wherein a second winning game symbol for the second win event matches a second subset symbol from the one or more of the subset of the game symbols, wherein the second subset symbol is paired with the second persistent enhancer; and adding, by the game-logic circuitry to a payout for the first game cycle via a credit meter presented on the display, the enhanced first award and the enhanced second award.

6. The method of claim 1, wherein the animating the increment of the respective value depicted via each of the one or more other ones of the persistent ratcheting enhancement objects is proportional to a collective number of the one or more win events that occurred.

7. The method of claim 6, wherein animating the increment of the respective value depicted via each of the one or more other ones of the set of persistent ratcheting enhancement objects is based on a plurality of increment tiers, wherein a first increment tier of the plurality of increment tiers increments an object value of at least one persistent ratcheting enhancement object of each of the one or more other ones of the persistent ratcheting enhancement objects by a first increment level until the object value of the at least one persistent ratcheting enhancement object has reached a first limit, and wherein in response to detecting that the first limit is reached, automatically switching to a second increment tier of the plurality of increment tiers, wherein the second increment tier increments the at least one persistent ratcheting enhancement object by a second increment level until the persistent-enhancer value has reached a second limit.

8. The method of claim 1, further comprising detecting, prior to incrementing the value of each of the one or more other ones of the persistent ratcheting enhancement objects, that the value of each of the one or more other ones of the persistent ratcheting enhancement objects has not reached a limit.

9. A wagering game system comprising:

a presentation assembly configured to perform operations to:

present an array associated with a plurality of symbol-bearing reels, wherein the plurality of symbol-bearing reels bear game symbols for a game; and animate, prior to a first game cycle of a plurality of game cycles for the game, a set of persistent ratcheting enhancement objects paired, via a persistent-enhancer table presented via a display of a gaming machine, with a subset of the game symbols, wherein each one of the set of persistent ratcheting enhancement objects is paired respectively with a separate game symbol of the subset of the game symbols, and wherein a respective value for each one of the set of persistent ratcheting enhancement objects is configured to persist, via the display, across the plurality of game cycles; and game-logic circuitry configured to execute instructions, which when executed cause the wagering game system to perform operations to:

use a random number generator to spin and stop the plurality of symbol-bearing reels for the first game cycle, to populate the array with a portion of the game symbols;

access at least one pay table stored in a memory device and animate based on the at least one pay table an indication of occurrence of one or more win events that use a given game symbol from the subset of the game symbols;

animate for each of the indicated one or more win events, via the display in response to animation of the indication of occurrence of the one or more win events, an enhancement of one or more award values of the one or more win events using one of the set of persistent ratcheting enhancement objects that is paired respectively with the given game symbol;

in response to animation of the enhancement, animate a reset, via the display, of the one of the set of persistent ratcheting enhancement objects to a default value; and animate, via the display, an increment of a value depicted via each of one or more other ones of the set of persistent ratcheting enhancement objects that were not used for animation of the enhancement of the one or more award values associated with the first game cycle, wherein the incremented respective value of each of the one or more other ones of the set of persistent ratcheting enhancement objects is configured to persist, via the display, to a second game cycle subsequent to the first game cycle.

10. One or more non-transitory, computer-readable storage media having instructions stored thereon, which, when executed by a set of one or more processors of a gaming machine, cause the set of one or more processors to perform operations comprising:

presenting an array associated with a plurality of symbol-bearing reels, wherein the plurality of symbol-bearing reels bear game symbols for a game;

animating, prior to a first game cycle of a plurality of game cycles for the game, a set of persistent ratcheting enhancement objects paired, via a persistent-enhancer table presented via a display of the gaming machine, with a subset of the game symbols, wherein each one of the set of persistent ratcheting enhancement objects is paired respectively with a separate game symbol of the subset of the game symbols, and wherein a value for each one of the set of persistent ratcheting enhancement objects is configured to persist, via the display, across a plurality of game cycles of the game;

using a random number generator, spinning and stopping the plurality of symbol-bearing reels for the first game cycle, to populate the array with a portion of the game symbols;

accessing at least one pay table stored in a memory device and animating based on the at least one pay table an indication of occurrence of one or more win events that use a given game symbol from the subset of the game symbols;

animating for each of the indicated one or more win events, via the display in response to the animating the indication of occurrence of the one or more win events, an enhancement of one or more award values of the one or more win events using one of the set of persistent ratcheting enhancement objects that is paired respectively with the given game symbol;

in response to animating the enhancement, animating, via the display, a reset of the one of the set of persistent ratcheting enhancement objects to a default value; and animating, via the display, an increment of each respective value depicted via each of one or more other ones of the persistent ratcheting enhancement objects that were not used for animating an enhancement of an award in the first game cycle, wherein the incremented respective value of each of the one or more other ones of the set of persistent ratcheting enhancement objects persists, via the display, to a second game cycle subsequent to the first game cycle.

* * * * *